United States Patent [19]

Carlsson

[11] Patent Number: 4,535,952
[45] Date of Patent: Aug. 20, 1985

[54] BAIL OPERATING MECHANISM FOR FISHING REELS

[75] Inventor: Lars-Olof Carlsson, Asarum, Sweden

[73] Assignee: Abu Aktiebolag, Svangsta, Sweden

[21] Appl. No.: 557,974

[22] Filed: Dec. 5, 1983

[30] Foreign Application Priority Data

Dec. 15, 1982 [SE] Sweden ............................... 8207160

[51] Int. Cl.³ ............................................ H01K 89/01
[52] U.S. Cl. ....................... 242/84.2 G; 242/84.21 H
[58] Field of Search ..................... 242/84.2 G, 84.2 F, 242/84.21 R, 84.21 H

[56] References Cited

U.S. PATENT DOCUMENTS

| 2,586,921 | 2/1952 | Delphon | 242/84.21 H |
| 2,773,654 | 12/1956 | Hübner | 242/84.21 R |
| 3,342,442 | 9/1967 | Brantingson | 242/84.2 G |
| 4,238,085 | 12/1980 | Jansson et al. | 242/84.2 G |
| 4,389,027 | 6/1983 | Sazaki et al. | 242/84.2 G |

FOREIGN PATENT DOCUMENTS

| 974961 | 9/1975 | Canada | 242/84.21 R |
| 2099671 | 12/1982 | United Kingdom | |

Primary Examiner—Stuart S. Levy
Assistant Examiner—Joseph J. Hail, III

Attorney, Agent, or Firm—Karl W. Flocks; Sheridan Neimark; A. Fred Starobin

[57] ABSTRACT

The present invention relates to fishing reels of the type having a crank-operated rotor supporting a bail pivotable thereon between a position for winding up the fishing line on the line spool and an open position for permitting the fishing line to run out from the spool which is now rotating during casting, the bail being pivotable manually by finger operation of an operating arm pivotably supported on the rotor and connected to the bail for pivoting the latter from its line winding position into the open position thereof for casting. To facilitate this finger operation the operating arm is pivotably movable in a plane parallel to the rotor axis about a pivot axis substantially perpendicular to the rotor axis and is connected to the bail for pivoting the latter into said open position through an intermediate link actuatable by said operating arm for actuating said bail, said link and said operating arm having cooperating guiding and engaging means for pulling the link rearwards in parallel with the rotor axis when the operating arm is pivoted in a direction radially of the rotor; and in that, on the one hand, a radius from the pivot axis of one end of the bail relative to the rotor to the pivot axis of the link relative to this bail end and, on the other hand, the path of movement of the guiding and engaging means carried by said operating arm form an obtuse angle relative to one another.

3 Claims, 4 Drawing Figures

BAIL OPERATING MECHANISM FOR FISHING REELS

The present invention relates to an arrangement in a fishing reel of the type comprising a frame supporting a line spool and having at its upper side a foot for connecting the fishing reel to a fishing rod in a suspended position underneath the rod, a rotor which is rotatably supported by the frame, means comprising a hand-operated crank for rotating said rotor in relation to the line spool, a bail, pivot means supported by the rotor and connecting arms at the ends thereof, said connecting arms connecting said bail to the rotor through said pivot means for permitting pivotable movement of the bail from a line winding first position for winding the fishing line upon the line spool when the rotor is rotated by means of said crank, to a second position in which the bail permits the fishing line to run out freely during casting, spring biasing means tending to return said bail to said first position and a locking mechanism which in locked position maintains the bail in its second position, and means for unlocking said locking mechanism for permitting spring return of said bail to said first position by rotation of said rotor by means of said crank for winding in the line, an operating mechanism for pivoting said bail into said free second position against the action of said spring means, said operating mechanism comprising a member supported by said rotor and extending with a portion thereof substantially parallel to the rotor axis in spaced relation to the rotor circumference and an operating arm pivotally connected with said member, the latter being settable by means of said rotor into a position at the upper side of the fishing reel, such that said operating arm is accessible to a finger of the hand holding the fishing rod.

In conventional fishing reels, the line is grasped by the hand holding the fishing rod, and the bail is swung out into open position by the other hand prior to casting. Recently, an arrangement has been developed which comprises an operating arm by which the bail can be swung into its second or open position by a finger of the casting hand, i.e. the hand holding the fishing rod, while at the same time the line can be caught. In this arrangement, the operating arm is in the form of a lever acting upon the bail adjacent one of the points in which the bail pivots on the frame of the fishing reel. To make this lever readily and conveniently accessible to and operable by the index finger of the hand holding the fishing rod, the lever is positioned relatively close to the fishing rod and is pivotable in such a path that the angler need not shift his grip on the fishing rod.

Prior art arrangements of this type suffer from several shortcomings. Although in some arrangements the lever is comparatively easily accessible to a finger, an undesired and successively greater strength is required to swing the bail when the bail approaches its second or open end position, and in other arrangements the lever acts upon the bail via a mechanism which forces the finger to move in an awkward and highly uncomfortable manner so that swinging the bail into the open position is experienced as a most uncomfortable and exhausting operation.

The present invention has for its object to provide a fishing reel. of the type referred to with means which facilitate catching of the line by hand and pivoting of the bail into open position for casting. Furthermore, the invention aims at providing a manual bail swinging mechanism having an operating arm which is readily accessible in an initial position thereof to the index finger of the "casting hand", i.e. the hand by which the angler holds the rod during casting, and which immediately afterwards and without requiring the angler to shift his grip on the fishing rod is easily pivotable upwards, that is in the direction of the normal position of a fishing rod, by the finger for pivoting the bail into open position by a slight, convenient crooking motion of the finger.

These objects have now been achieved by the arrangement according to the invention which is characterised in that the operating arm is mounted pivotably about a pivotal axis substantially perpendicular to the rotor axis, for pivotal movement in a plane substantially parallel to the rotor axis, said arrangement comprising an intermediate movable link acting between said bail and said operating arm; one end portion of said link and said operating arm comprising cooperating guiding and engaging means for pulling the link rearwardly substantially in parallel with the rotor axis by pivoting said operating arm manually outwards from the rotor, the other end portion of said link being pivotably connected to the bail arm at a radial distance from the axis of said bail arm relative to the rotor; and in that the radius from pivotal axis of the bail arm to the pivotal axis of the link relative to the bail arm forms an obtuse angle to the path of movement of said guiding and engaging means carried by said operating arm.

The invention will be described in greater detail below, reference being had to the accompanying drawings in which.

Figure 1:
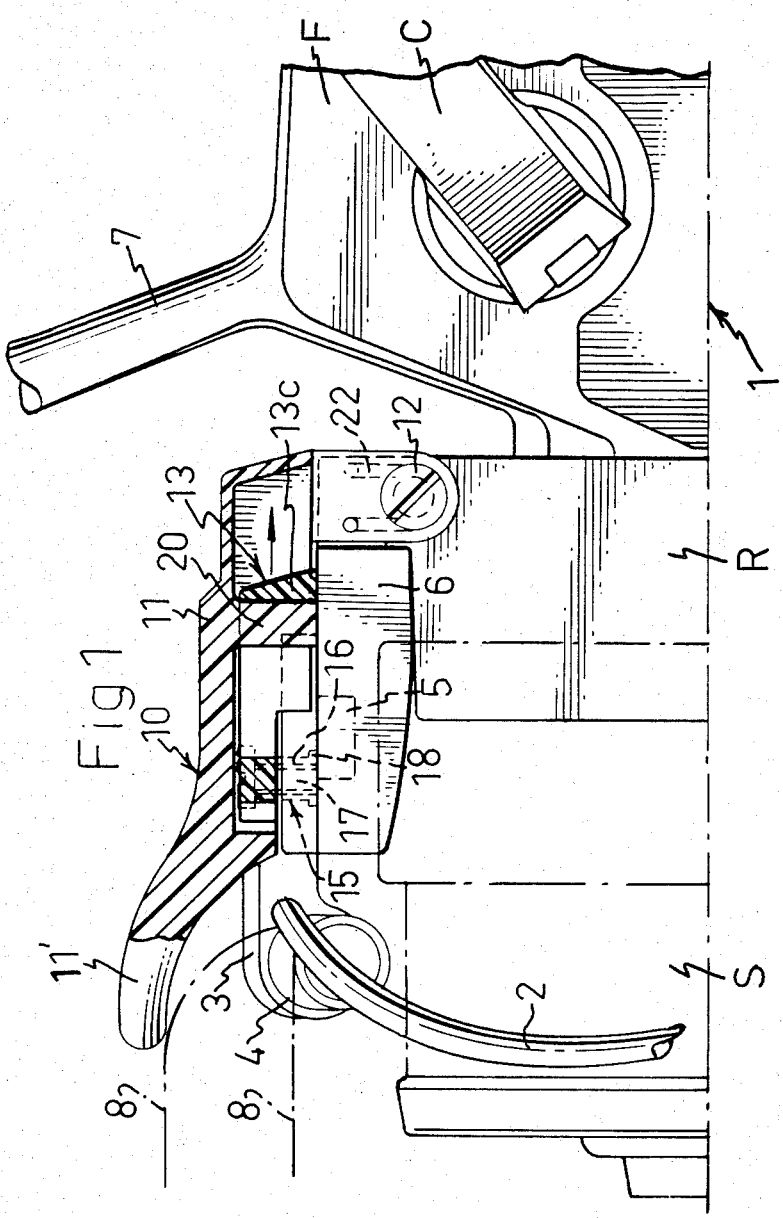
FIG. 1 is a fragmentary view of a fishing reel equipped with the arrangement according to the invention for pivoting the bail from the line winding first position illustrated to a second position open to release the line for casting, said arrangement being shown in a cross-sectional view along the line I—I in FIG. 3.
Figure 2:
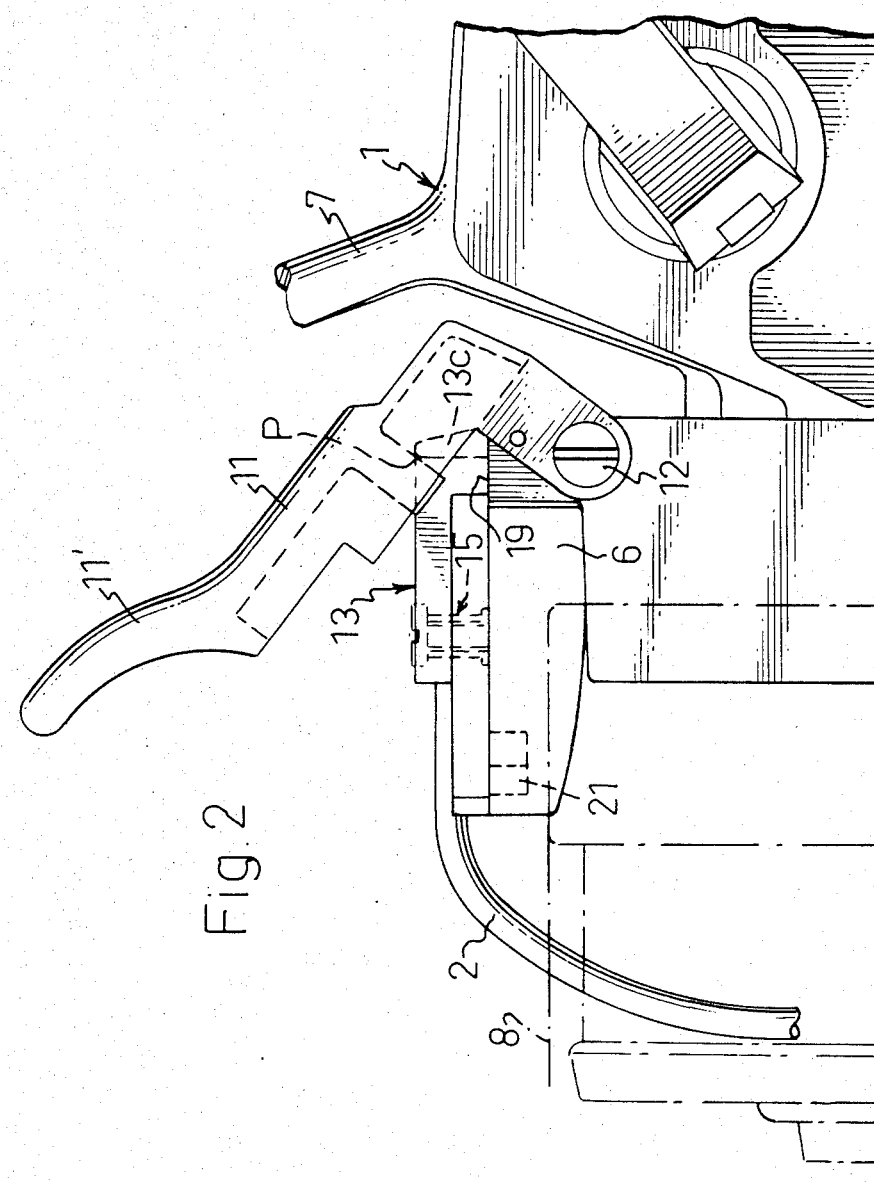
FIG. 2 is a similar view as FIG. 1, but shows the operating arm in the arrangement according to the invention at the end of a finger-operated movement for pivoting the bail to the shown open, second position thereof.

The fishing reel 1 as fragmentarily shown in FIGS. 1 and 2 comprises a frame F, a rotor R which is rotatably supported by the frame and supports a line winding bail 2. The rotor with the bail is rotatable by means of a hand crank C for winding up the fishing line 8 by means of the bail onto a stationary line spool S supported by the frame in front of and coaxial in relation to the rotor. The bail is pivotably connected, in conventional manner, with the rotor through a pair of connecting arms of which only one arm 3 is shown in FIGS. 1 and 2. This bail arm 3 is provided with a line guide 4 forming an attachment for the corresponding bail end. The inner end portion of each bail arm 3 is mounted in known manner by means of pivot means 5 in a part 6, connected to the rotor, and the arm 3 which is shown, or the other arm (which is not shown) at the opposite end of the bail, is adapted in known manner to cooperate with a locking mechanism (not shown) which automatically locks the bail when it is pivoted from a line winding first position to, and arrives at, an open second position shown in FIG. 2. The locking mechanism is automatically released by rotation of the crank to permit the bail to be returned by spring biasing means (not shown) into the position shown in FIG. 1. It may be mentioned that the arm 3 may have basically the same function as the arm 26b according to Swedish published application No. 7706721-3, apart from certain modifications adapted to enable it to cooperate with the arrangement acccording to the invention as described below.

Figure 3:
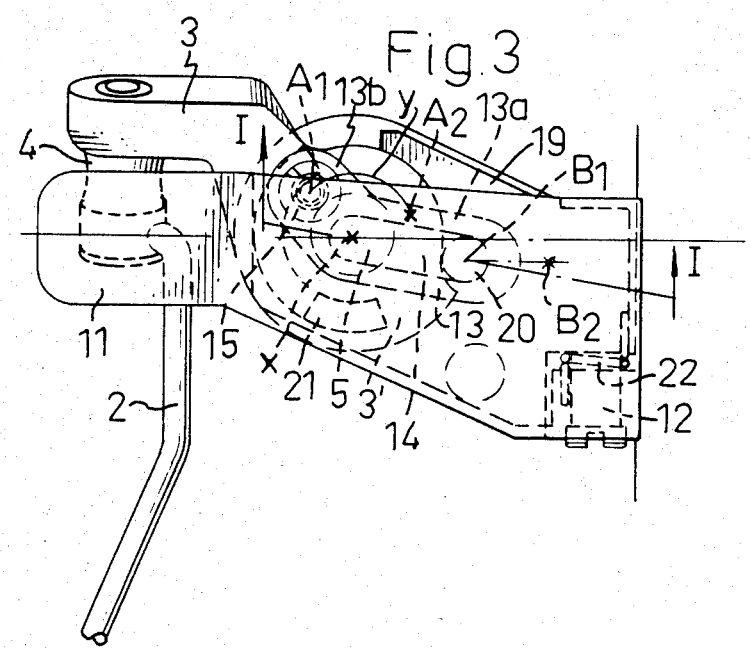
FIGS. 3 and 4 are plan views of the arrangement shown in FIGS. 1 and 2, respectively.
Figure 4:
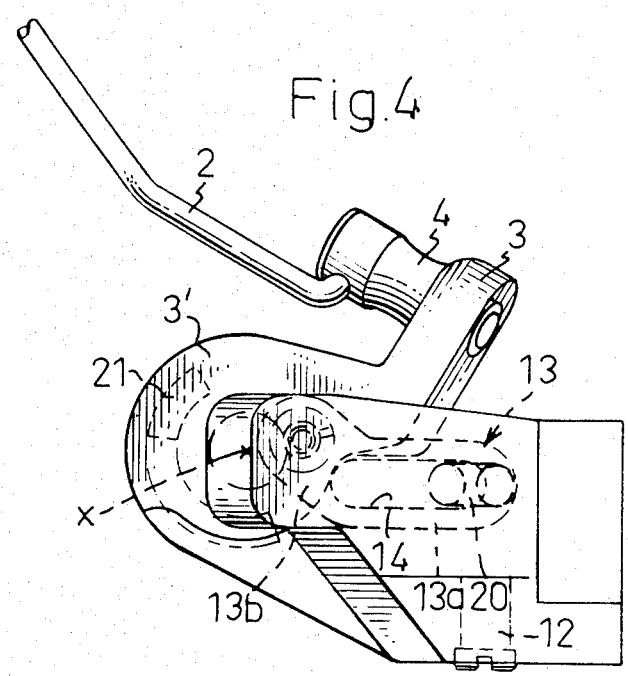

The frame F of the fishing reel 1 has a foot, such as the foot 7 fragmentarily shown in FIGS. 1 and 2, adapted to be detachably mounted on a fishing rod (not shown) in a position in which the fishing reel is suspended from the rod. In conventional fishing reels of the type here intended, the line and the bail are handled by one hand during casting, while the other hand is used for retrieving the line after casting. Preparatory to a cast, the angler pivots the bail 2 from the position shown in FIG. 3 into the open or free casting position shown in FIG. 4, which is done with the right hand if the angler holds the fishing rod with that hand, and at the same time the line is caught and held with the right hand during the initial phase of the cast.

With the fishing reel 1 equipped with the arrangement according to the invention which is generally designated 10 and will be described in detail in the following, the bail 2 is simply and conveniently pivotable into its open casting position with the hand, "the rod hand", with which the angler is holding the rod. The index finger of the rod hand is placed under the line 8 which is moved upwards against the underside of a finger grip 11' of a lever 11 pivotally mounted on a pivot pin 12. By slightly crooking the finger, the angler pivots the lever 11 upwards into the position shown in FIG. 2, while simultaneously, and as a result thereof, a link 13 is pulled rearwardly in the direction indicated by an arrow in FIG. 1, from a forward end position to a rearward end position which is shown in FIG. 2. During this movement, the link 13 acts on the bail arm 3 to swing it from the position shown in FIG. 3 into the position shown in FIG. 4 which is the open position for casting and in which the bail is locked by means of the above-mentioned locking mechanism (not shown) which is releasable by means of the crank for permitting return of the bail under the action of return springs (not shown) when line retrieval is begun.

It should be noted that the operating arm 11 is not always located at the upper side of the fishing reel since the means 6 by which the bail arms are pivotally interconnected, are carried by the rotor and thus are rotatable together therewith. It may therefore be necessary to set the rotor in correct position by means of the crank in order to make the operating arm 11 assume its proper position at the upper side of the rotor. If desired, the rotor may be equipped with a mechanism by which it is automatically stopped in correct position for the operating arm 11, for instance by the provision of an abutment which stops the rotor in that correct position when the rotor, by means of the crank, is rotated through a small angle backwards in relation to the line winding direction.

In conventional fishing reels of the type here intended, the bail is pivotable within a relatively large angle, for instance about 120°, between the two above-mentioned casting and line retrieval positions. The angle for pivoting the bail from the line retrieval position to the open, free position for casting is relatively large to prevent the bail from being entangled by the line. Using an auxiliary operating mechanism accessible to the index finger of the "casting hand" to swing the bail into said open position, frequently makes it difficult to maintain this relatively large angle because the angler must exert considerable strength to be able to operate the bail arm 11 with his index finger which thus is placed under severe strain. It will be appreciated that the strain placed on a finger extended from the "rod hand" should be as low as possible, and that the path of motion of the finger grip 11' should follow the natural motion of a finger which is being crooked, without compelling the angler to shift his grip on the rod and without giving him the feeling of acute discomfort which he experiences if he has to apply force by means of his finger in a direction which changes and does not follow the natural movement of his index finger when crooked and the rest of the hand is not moved. The present invention, while ulitizing a normal bail pivot angle, solves these difficulties by means of a simple but unique power transmission mechanism between the operating arm 11 and the bail arm 3, a power transmission mechanism which comprises the link 13 already mentioned.

In the preferred embodiment illustrated in the drawings, the link 13 is in the form of a plate having an angularly offset extension. More particularly, the link is substantially L-shaped and comprises two legs 13a, 13b located in the same plane. The outer free ends of these legs are circularly rounded. The rear leg 13a has an elongated slot 14, the longitudinal axis of which coincides with the longitudinal axis of the leg 13a, while the other leg 13b has a circular opening for a journal 15 by which the link is pivotally connected to a substantially disk-shaped rear end portion 3' of the bail arm 3. The journal 15 comprises a bearing sleeve 16 mounted on a screw 17 and inserted through a mating opening in the end portion 3' on the arm 3 from the underside of said end portion and extending out through the upper side thereof. The journal 15 is fixed in relation to the bail arm 3 by means of the screw 17 which is screwed into the internally threaded sleeve 16 and engages with its head a counterbore of the opening in the leg 13b of the link 13. The sleeve 16 has a flange 18 accommodated by a counterbore of the opening in the bail arm 3 and has a fluted lower end portion for engaging the wall around the opening in the bail arm, and a portion of the sleeve located above said bail arm having a smooth circumferential surface constituting a bearing surface for the link 13. The link rests with its planar underside against a planar upper side of the disk-shaped head 3' of the bail arm 3 except at its rear end where the link 13 is supported on a planar surface 19 (see FIG. 3) of the rotor.

The link 13 pivotable about the journal 15 is movable forwardly and rearwardly between the two end positions shown in FIGS. 1 and 2, by pivotal movement of the operating arm 11 about its journal 12, in that the operating arm 11 has a pin-shaped projection 20 protruding from its underside. The projection 20 engages with the elongated slot 14 and normally always engages with a cylindrical circumferential surface against the rear end of the slot 14, said rear end being circularly rounded.

When the arm 10 is pivoted upwards from the position shown in FIG. 1 into the position shown in FIG. 2, the projection 20 pulls the link 13 rearwardly. Because the articulation between the link 13 and the disk-shaped rear end portion 3' of the bail arm 3 has a certain radius to the axis of rotation X of the link 13 relative to the pivot axis of the pivot means in the member 6, and because this radius forms an angle relative to the path of motion $B_1$–$B_2$ of the point of action P of the operating arm 11 (see FIG. 2) on the link 13 and is pivotal about said axis of rotation X, the bail arm 3 will be pivoted relative to the axis of rotation X when the link is pulled rearwardly. The journal 15 will thus be moved along a circular arc, the centre of which lies on the axis X. The projection 20 of the operating arm 11, which projection moves along a straight line when the operating arm 11 is pivoted upwards, constitutes a pivotal axis about which the link 13 is pivotable during the movement of the longitudinal axis of the journal 15 through about 120° along a circular arc y from the position $A_1$ to the position $A_2$ in FIG. 3. This angle requires but a relative short movement ($B_1$–$B_2$) of the rear end of the link 13 according to FIG. 3. To limit the pivot movement of the bail arm 3 to the angle required for pivoting the bail 2 into the fully free position of the line, the end portion 3' of the bail arm has a stop abutment 21 cooperating with a stationary abutment of the member 6. By this limitation it is ensured that the point $A_1$ in FIG. 3 does not reach a dead center position from which the link could not be returned by means of the bail arm. Such a dead center position could lock and maintain the bail in open position.

As will appear from a comparison of FIGS. 1 and 2, the pin-shaped projection 20 will act, during the upward swinging movement of the operating arm 11, on the rear upper edge portion of the link 13, i.e. in the region of the rear circular end of the slot 14. In view hereof, said rear upper edge is rounded in this region. The supporting surface of the stop 13c is, like the supporting surface 15 which cooperates with said surface of the stop 13c, smooth for adequate support and easy sliding movement.

The operating arm 11 is returned automatically when released, by means of a return spring 22 mounted on the pivot pin 12 for the operating arm. The return spring 22 is fixed at one end to the rotor and at its other end to the operating arm.

The present invention brings the advantage that the movement of the operating arm 11 will be relatively short, in spite of a relatively large pivot movement, such as 120°, of the bail 2 from the position shown in FIG. 1 to the position shown in FIG. 2, and that the pivot movement of the operating arm is a movement substantially in an upward and rearward direction. Because the engagement means of the link 13 for the pin-shaped projection 20 of the operating arm 11 is an elongated slot, the projection 20 of the operating arm always finds its way into the slot when the operating arm is released and returned by the spring 20. Another characteristic feature of the invention is that the risk of malfunction, resulting in a locking or binding of the components, or the non-occurrence of the engagement position after the operating arm has been returned, is completely eliminated. When the bail is automatically returned upon line retrieval, the link 13 is withdrawn to the initial position shown in FIGS. 1 and 3, whereby the pin 20 of the operating arm 11 automatically resumes its initial position preparatory to the next bail-pivoting movement.

All components, except the springs, screws and the bearing sleeve, may be molded in plastic material, although other materials and production methods are possible. Furthermore, the shape of the components, such as the pin or projection 20 and the link 13, may be modified within the scope of this invention.

What I claim and desire to secure by Letters Patent is:

1. An arrangement in a fishing reel with spring biasing and locking mechanism comprising a frame supporting a line spool and having at an upper side a connecting foot, a rotor which is rotatably supported by the frame, means comprising a hand-operated crank for rotating said rotor in relation to the line spool, a bail having opposite ends, pivot means supported by the rotor and bail, bail arms supported at the ends of said bail and connecting the bail to the rotor via said pivot means which permits pivotable movement of the bail from a line winding first position for winding the fishing line upon the line spool when the rotor is rotated by means of said crank, to a second position in which the bail permits the fishing line to run out freely during casting, a spring means for the biasing of said bail to said first position and a locking means for the locking of the bail in its second position and unlocking of the bail to permit return of said bail to said first position by rotation of said rotor by means of said crank for winding in the line, an operating mechanism for pivoting said bail into said free second position against the action of said spring means, said operating mechanism comprising a member supported by said rotor and extending with a portion thereof substantially parallel to the rotor axis in spaced relation to the rotor circumference, and an operating arm pivotally connected with said member, such that said operating arm, when in a position at the upper side of the fishing reel, is accessible to a finger of a hand held in a position adjacent said foot at the upper side of said fishing reel, said operating arm being mounted pivotably about a pivotable axis substantially perpendicular to the rotor axis, an intermediate movable link acting between said bail and said operating arm, said intermediate link and said bail arm comprises cooperating guiding and engaging means, said guiding means comprises an elongated slot, and said engaging means comprises a projection which movably engages said elongated slot for movement therealong to and from an abutment means for pulling the link rearwardly substantially in parallel with the rotor axis pivoting said bail arm manually outwards from the rotor, the outer end portion of said link being pivotably connected to one of said bail arms at a radial distance from the axis of rotation of said bail arm about said pivot means relative to the rotor, and the radius from said pivotable axis of the bail arm to the pivotable axis of the link relative to the bail arm forms an obtuse angle to the path of relative movement between said guiding and engaging means.

2. An arrangement as claimed in claim 1, wherein said guide means is an elongated slot provided in said intermediate link and said engaging means is a pin projecting from said bail arm.

3. An arrangement as claimed in claim 1, wherein said bail arm and said intermediate link are pivotably connected such that a point of articulation there-between, in the line retrieval first position of the bail, is located ahead of the pivotable axis of said pivot means in relation to the rotor and is located behind said last-mentioned axis in the said second position of said bail.

* * * * *